United States Patent
Porret et al.

(10) Patent No.: US 8,644,427 B2
(45) Date of Patent: Feb. 4, 2014

(54) RADIO FREQUENCY RECEIVER WITH DUAL BAND RECEPTION AND DUAL ADC

(75) Inventors: Alain-Serge Porret, Sunnyvale, CA (US); Friederich Mombers, Sunnyvale, CA (US); Melly Thierry, Lausanne (CH)

(73) Assignee: SiGear Europe Sarl, Lausanne (CH)

( * ) Notice: Subject to any disclaimer, the term of this patent is extended or adjusted under 35 U.S.C. 154(b) by 342 days.

(21) Appl. No.: 13/206,684

(22) Filed: Aug. 10, 2011

(65) Prior Publication Data

US 2013/0039444 A1  Feb. 14, 2013

(51) Int. Cl.
H04L 27/06 (2006.01)

(52) U.S. Cl.
USPC ........... 375/340; 375/347; 375/349; 375/351; 370/204; 455/61; 455/93; 455/102; 455/133; 455/140; 455/142; 455/143; 455/187.1

(58) Field of Classification Search
CPC ...... H04B 7/08; H04B 7/0802; H04B 7/0868; H04B 7/0817; H04B 7/0822; H04B 7/0825; H04B 7/0871; H04B 7/0874; H04B 7/0877; H04B 7/0888; H04B 7/088885
USPC ................. 375/267, 340, 347, 349, 350, 351; 370/204; 455/61, 93, 102, 133, 140, 455/143, 187.1
See application file for complete search history.

(56) References Cited

U.S. PATENT DOCUMENTS

| | | | |
|---|---|---|---|
| 5,285,284 A | 2/1994 | Takashima et al. | |
| 5,966,646 A | 10/1999 | Lampe et al. | |
| 6,072,996 A | 6/2000 | Smith | |
| 6,353,463 B1 | 3/2002 | Seo | |
| 6,999,716 B1 | 2/2006 | Andre et al. | |
| 7,403,508 B1 * | 7/2008 | Miao | 370/335 |
| 7,627,297 B2 | 12/2009 | Nam | |
| 7,937,052 B2 * | 5/2011 | Banh et al. | 455/140 |
| 8,027,418 B2 * | 9/2011 | Motoda | 375/347 |
| 2005/0079849 A1 | 4/2005 | Na et al. | |
| 2006/0089115 A1 | 4/2006 | Goodman | |
| 2006/0240793 A1 | 10/2006 | Andre et al. | |
| 2007/0004335 A1 | 1/2007 | DeMoor et al. | |
| 2008/0042777 A1 | 2/2008 | Lee et al. | |
| 2008/0112519 A1 | 5/2008 | Jung et al. | |
| 2008/0232480 A1 * | 9/2008 | Tuttle et al. | 375/259 |
| 2008/0285684 A1 | 11/2008 | Shen et al. | |
| 2009/0253456 A1 | 10/2009 | Toh et al. | |
| 2009/0290659 A1 | 11/2009 | Petrovic et al. | |
| 2010/0097966 A1 | 4/2010 | Chen | |
| 2010/0295598 A1 | 11/2010 | Darabi et al. | |
| 2011/0019723 A1 * | 1/2011 | Lerner et al. | 375/219 |

* cited by examiner

*Primary Examiner* — Sophia Vlahos

(74) *Attorney, Agent, or Firm* — Van Pelt, Yi & James LLP

(57) ABSTRACT

A radio frequency receiver with dual band reception and dual analog-to-digital converters (ADCs) can be configured to operate in a single channel mode or a dual channel mode to receive a single RF input channel or two RF input channels at the same or different frequency bands. In the single channel mode, the dual ADCs can be used to improve the performance of the receiver for the single input signal or the dual ADCs can be configured for reduced power consumption. In the dual channel mode, the dual ADCs operate on the individual RF input signals to realize dual band reception. In one embodiment, the receiver is configured for asymmetric dual band reception to receive a wideband input signal on a first input signal path and a narrow band input signal on a second input signal path.

20 Claims, 6 Drawing Sheets

RADIO FREQUENCY RECEIVER WITH DUAL BAND RECEPTION AND DUAL ADC

FIELD OF THE INVENTION

The present invention relates to a radio frequency receiver, and in particular, the present invention relates to a wideband radio frequency receiver including dual input signal paths capable of receiving two input channels within the same or different frequency bands.

DESCRIPTION OF THE RELATED ART

A television (TV) or video recorder includes a television signal receiver (or television receiver) to receive terrestrial broadcast, cable television or satellite broadcast television signals and to process the television signals into the appropriate video and audio signals for display or for recording. Television signals are transmitted in analog or digital formats and in accordance with a variety of standards. For analog television transmission, the NTSC (National Television Standards Committee) standard, the PAL (Phase Alternate Lines) standard, and the SECAM (Sequential Couleur Avec Memoire) standard are widely adopted. On the other hand, for digital television (DTV) transmission, the DVB (Digital Video Broadcast) format, the ATSC (Advanced Television Standards Committee) format and other digital television broadcasting formats are available. The different television formats and different television standards are incompatible and television receivers are traditionally made specifically for the analog or digital format and for a specific standard. However, television receivers for receiving both analog and digital formats and for receiving multiple television standards have been developed.

A television receiver receives the incoming television signal in radio frequency (RF) and converts the incoming RF signal to an intermediate frequency (IF) signal. Then, the receiver converts the IF signal to a video baseband signal and an audio baseband signal using one or more demodulators. The baseband signals are then coupled to appropriate video and audio decoders to generate the video signals (e.g. RGB) for display and audio signals for playback. In general, the conventional television receiver includes a tuner for receiving the input RF signal and converting the RF signal to an intermediate frequency (IF) signal by one or more frequency conversions. The frequency conversions are generally implemented as single or dual super-heterodyne conversions. The intermediate frequency may be dictated by the geographical area the receivers are to be used. In some television receivers, a low-IF or zero-IF architecture is used where the input RF signal is converted to a low IF signal or converted directly to baseband.

The demodulator of a television receiver is typically a dedicated component and designed specifically for a predetermined television signal format and a predetermined television standard. For analog television signal reception, the demodulator is a VIF/SIF (video intermediate frequency/sound intermediate frequency) module. The VIF/SIF module provides a video output called CVBS (Composite Video, Blanking, Sync, or Composite Video baseband signal) and audio outputs in baseband or intermediate frequency, such as MPX or A2. For digital television signal reception, the demodulator is a digital demodulator or a decoder to decode the baseband signals and generate a MPEG transport stream as output signals.

SUMMARY OF THE INVENTION

According to one embodiment of the present invention, a radio frequency receiver includes a first RF preprocessing circuit configured to receive a first RF input signal associated with a first input channel and to generate output signals indicative of a first intermediate frequency (IF) signal; a second RF preprocessing circuit configured to receive a second RF input signal associated with a second input channel and to generate output signals indicative of a second IF signal; a signal selector configured to select a set of signals from the output signals of the first and second RF preprocessing circuits; a configurable intermediate frequency (IF) filter circuit configured to filter the set of signals selected by the signal selector; and a dual analog-to-digital converter (ADC) circuit comprising a first ADC circuit and a second ADC circuit where the dual ADC circuit is configured to receive the filtered signals from the IF filter circuit and to digitize the filtered signals using one or both of the first and second ADC circuits based on one or more operation modes. The dual ADC circuit is configured to generate digital output signals indicative of one or more digitized IF signals.

In operations, when the receiver is configured to receive one input channel only on one of the first and second RF preprocessing circuits, the dual ADC circuit is configured in a first operation mode to receive at least one filtered signal associated with the input channel and to digitize the at least one filtered signal using at least one of the first and second ADC circuits.

Furthermore, when the receiver is configured to receive two input channels on respective first and second RF preprocessing circuits, the dual ADC circuit is configured in a second operation mode to receive filtered signals associated with the two input channels and to digitize the filtered signals associated with each input channel using respective first and second ADC circuits.

The present invention is better understood upon consideration of the detailed description below and the accompanying drawings.

BRIEF DESCRIPTION OF THE DRAWINGS

FIGS. 3(a) to 3(d), illustrates four operation modes in which the receiver of FIG. 2 can be operated according to embodiments of the present invention.

FIGS. 4(a) to 4(d), illustrates the IF filters which can be used for each of the four operation modes in FIG. 3 according to embodiments of the present invention.

DETAILED DESCRIPTION OF THE PREFERRED EMBODIMENTS

In accordance with the principles of the present invention, a radio frequency receiver with dual band reception and dual analog-to-digital converters (ADCs) can be configured to operate in a single channel mode or a dual channel mode to receive a single radio frequency (RF) input channel or two RF input channels at the same or different frequency bands. When the receiver is configured in the single channel mode, the dual ADCs can be used to operate on the single input channel to improve the performance of the receiver for the single input channel. Alternately, the dual ADCs can be configured to operate on the single input channel for reduced power consumption. When the receiver is configured in the dual channel mode, the dual ADCs operate on the individual RF input channels to realize dual band reception. In one embodiment, the receiver is configured for asymmetric dual band reception for receiving a wideband input signal on a first input signal path and a narrow band input signal on a second input signal path. The dual band receiver of the present invention realizes high performance with minimal hardware and is configurable to adapt to different applications for receiving one or more RF input channels in different signal formats or different signal standards.

Figure 1:
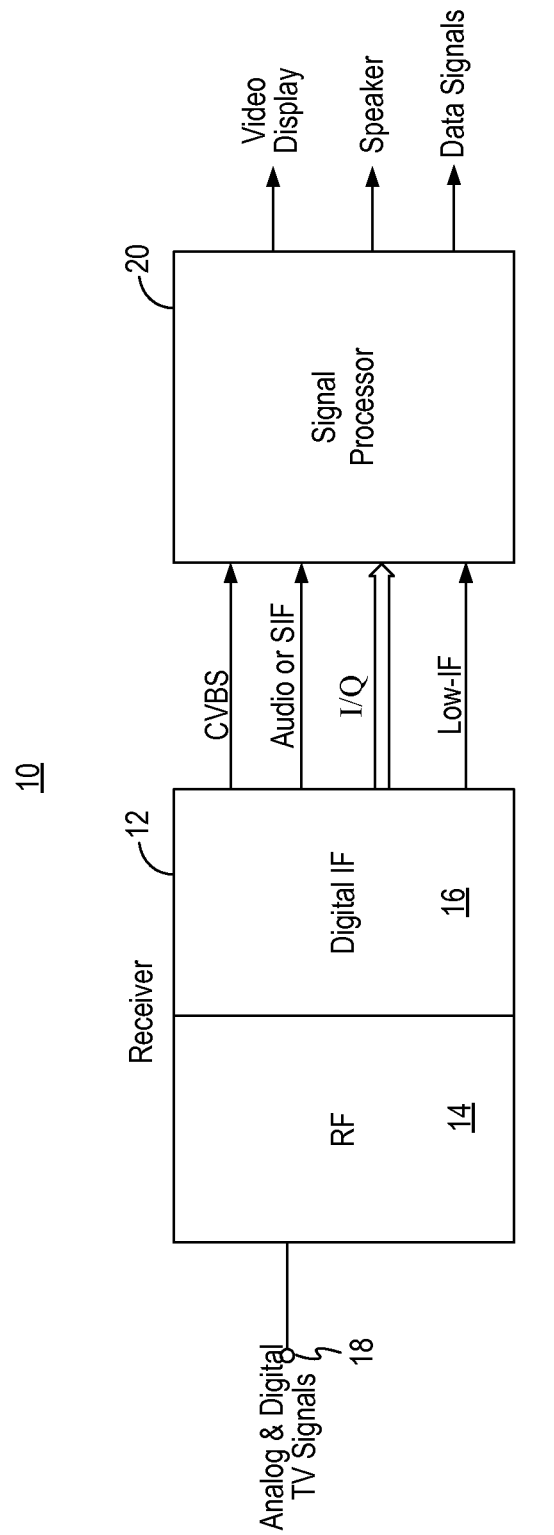
FIG. 1 is a schematic diagram of a television system according to one embodiment of the present invention.

FIG. 1 is a schematic diagram of a television system according to one embodiment of the present invention. Referring to FIG. 1, a television system includes a receiver 12 for receiving television signals on an input terminal 18. The television signals may be received on an antenna or from a cable connection. Receiver 12 includes an RF processing block 14 and a digital IF processing block 16. The RF processing block 14 receives the incoming television signal in radio frequency (RF) and converts the incoming RF signal to an intermediate frequency (IF) signal. The IF signal is digitized to a digital IF signal. The digital IF signal is provided to the digital IF processing block 16 which converts the digital IF signal to video baseband signals and audio baseband signals using one or more demodulators. In embodiments of the present invention, receiver 12 generates a composite video signal, such as CVBS, and audio signals, such as the sound intermediate frequency (SIF) signal, for analog television signal formats. Receiver 12 may further generate in-phase I and quadrature phase Q signals for digital television signal formats. Receiver 12 also may further generate a low-IF signal having a non-zero low or moderate intermediate frequency for digitally modulated signals. The video/audio signals, the I and Q digital television signals and/or the low-IF signal are provided to a signal processor 20 which processes the received signals, including decoding the signals, and generates video signals for the display and audio signals for the speakers. In some embodiments, signal processor 20 may further generate data signals which may be used to control the operation of the television system. For instance, the data signals may be signals received from a remote control device associated with the television system.

Figure 2:
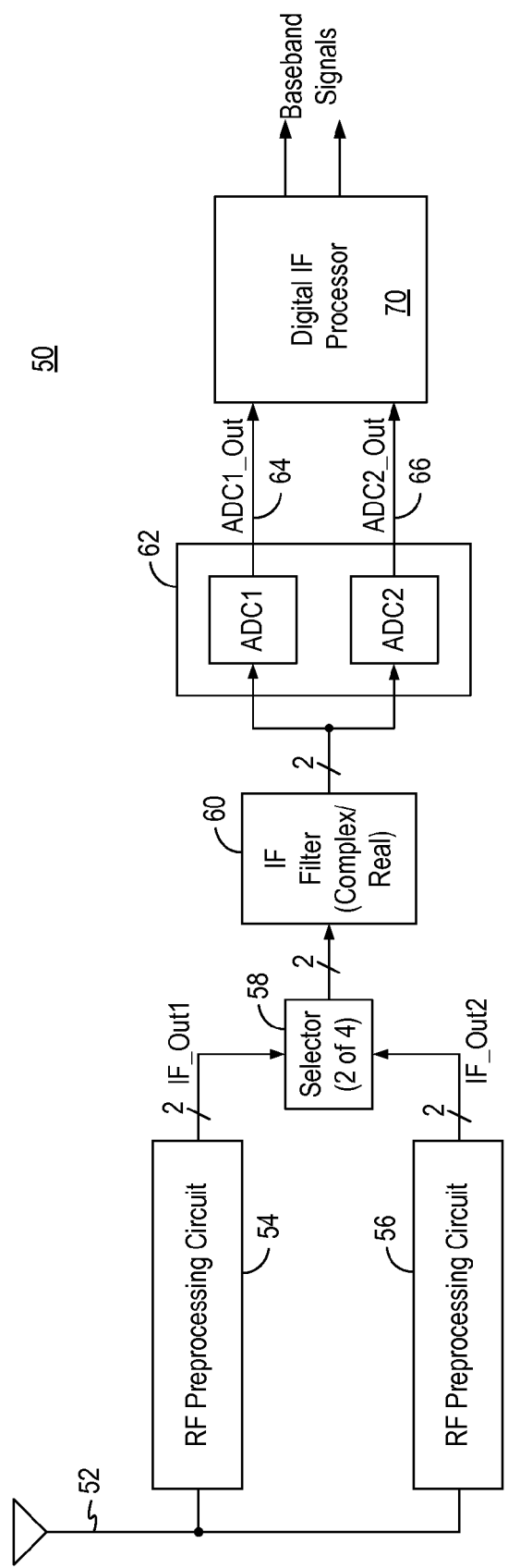
FIG. 2 is a schematic diagram of a radio frequency receiver with dual band reception and dual analog-to-digital converters (ADC) according to one embodiment of the present invention.

FIG. 2 is a schematic diagram of a radio frequency receiver with dual band reception and dual analog-to-digital converters (ADC) according to one embodiment of the present invention. Referring to FIG. 2, a receiver 50 receives radio frequency (RF) input signals from an input source. In the present illustration, the receiver 50 receives the RF input signals from an antenna 52. In other embodiments, the receiver 50 may receive RF input signals from other sources, such as a cable connection. The RF input signals are provided to first and second RF preprocessing circuits 54, 56. Each of the first and second RF preprocessing circuits 54, 56 is configured to detect and process an input channel being an input RF signal in a selected frequency band. Each of the first and second RF preprocessing circuits 54, 56 generates intermediate frequency (IF) signals, denoted IF_Out1 and IF_Out2 respectively. In embodiments of the present invention, each RF preprocessing circuit 54, 56 is capable of generating one or two output signals representative of the IF signal of the received RF signal, depending on the format of the received RF signal.

More specifically, in embodiments of the present invention, the RF preprocessing circuit generates a real IF signal. For example, the RF preprocessing circuit generates a real IF signal when the RF input signal is an analog format television signal. A real IF signal can also be generated for other types of RF input signals. In this case, the IF_Out signal includes only a single IF signal and the second output signal of the RF preprocessing circuit is not used. In some embodiments, the real IF signal is a low-IF signal with the signal spectrum centered around a low-IF value, such as 40 MHz. In other embodiments, the real IF signal is the standard IF value set for the geographical area the receiver is to be used. For instance, there are currently five intermediate frequency values being used in the world. For example, in the United States, the standard IF is 41 to 47 MHz.

Furthermore, in embodiments of the present invention, the RF preprocessing circuit generates a complex IF signal. For example, the RF preprocessing circuit generates a complex IF signal when the RF input signal is a digital format television signal. A complex IF signal can also be generated for other types of RF input signals. A complex IF signal includes the in-phase signal (I) and the quadrature-phase signal (Q) centered around the intermediate frequency. In this case, the IF_Out signal of each RF preprocessing circuit includes two signals being the I and Q signal components of the complex IF signal.

In the present description, a complex IF signal refers to a complex signal represented by two real signals denoted as in-phase (I) and quadrature-phase (Q) signals. The complex signal S is given as $S=I+jQ$, where $j=\sqrt{-1}$. In a quadrature receiver, the input RF signal is down-converted to the I and Q signals, with signal spectra centered around the baseband frequency (zero-IF) or around a low-IF value, such as 40 MHz.

The IF signals IF_Out1 and IF_out2, complex or real, generated by the two RF preprocessing circuits 54, 56 are coupled to a signal selector 58 which selects two out of the four possible IF signals generated by the RF preprocessing circuits. The selected signals are coupled to an IF filter circuit 60 being a configurable filter circuit. IF filter circuit 60 can be configured as a complex filter or as two real filters, depending on the type of the signals selected by the signal selector 58. The filtered IF signals are provided to a dual ADC block 62. Dual ADC block 62 includes a first analog-to-digital converter ADC1 and a second analog-to-digital converter ADC2 configured in parallel. Each ADC circuit operates on one filtered IF signal from the IF filter circuit 60 to generate digitized IF signals as a first ADC output ADC1_out (node 64) and a second ADC output ADC2_out (node 66). The digitized IF signals ADC1_out and ADC2_out are then provided to a digital IF processor 70 which processes the digitized IF signals to generate the baseband or low-IF signals to be processed by a subsequent signal processor.

As thus configured, the receiver 50 is configurable to allow the dual ADC block 62 to support reception of a single RF input channel or two RF input channels. The single RF input channel may be downconverted to a one real IF signal or a complex IF signal at zero-IF or at Low-IF. The two RF input channels will be downconverted to two real low-IF signals. Accordingly, in embodiments of the present invention, receiver 50 can be operated in multiple operating modes depending on the number of desired RF input channels and the desired operating parameters. Receiver 50 realizes an efficient and flexible design where the same hardware can be readily configured to support different applications. In embodiments of the present invention, receiver 50 is configured to operate in a single channel mode and a dual channel mode. Furthermore, in some embodiments, the receiver 50 is configured to operate in a single channel mode optimized for high performance or a single channel mode optimized for low power consumption. In one embodiment, the selection of the different operation modes in the receiver is controlled by a processor operating in conjunction with the receiver for selecting the desired operation modes.

Figure 3:
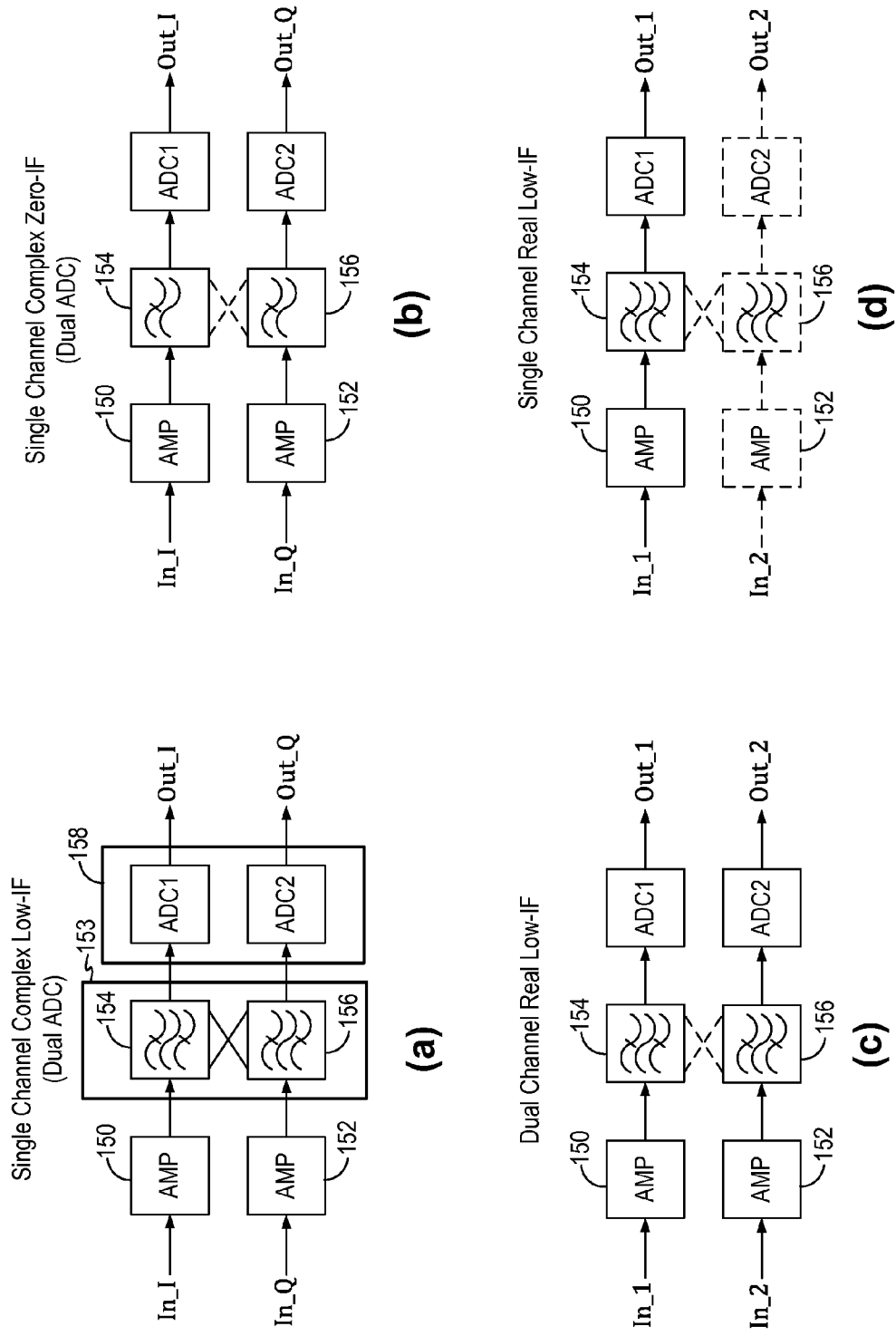
FIG. 3, which includes

FIG. 3, which includes FIGS. 3(a) to 3(d), illustrates four operation modes in which the receiver 50 can be operated according to embodiments of the present invention. More specifically, FIG. 3 illustrates the ways the dual ADC block 62 in receiver 50 can be reconfigured to support the different operation modes of the receiver. The operation modes of the receiver 50 will be described with reference to FIGS. 2 and 3. In FIG. 3, the selected signals from the signal selector 58 are shown as first and second input signals which are coupled to respective amplifiers 150, 152. Amplifiers 150 and 152 function as input buffering stages to the IF filter circuit that follows. Amplifiers 150 and 152 are optional and may be included to boost the signal level of the input signals when desired. It is understood that one or more amplifiers or buffering stages may be included at different locations in receiver 50 of FIG. 2 to provide desired signal buffering or amplification.

In operation, the input signals to amplifiers 150, 152 can be the I and Q signals of a complex IF signal, denoted as In_I and In_Q. Alternately, the two input signals can each be a real IF signal of the respective RF input channel, denoted as In_1 or In_2. The input signals are coupled to an IF filter circuit 153. IF filter circuit 153 may be configured as one complex filter or two independent real filters 154 and 156, depending on the nature of the input signals. The filtered signals are then provided to the ADC block 158 including two analog-to-digital converters ADC1 and ADC2 to be digitized. ADC1 and ADC2 generate digitized output signals, being Out_I and Out_Q signals for complex IF signals or Out_1 and Out_2 signals for real IF signals.

In embodiments of the present invention, receiver 50 is configured to operate in a single channel mode where a single RF input channel is received. Thus, only one of RF preprocessing circuits 54, 56 (FIG. 2) receives a wanted input signal and the other RF preprocessing circuit is not used. When the receiver 50 is used to receive only one RF input channel, the receiver 50 can be configured to optimize power consumption or to optimize performance.

Accordingly, in embodiments of the present invention, receiver 50 is operated in a single channel mode with low power consumption as shown in FIG. 3(d). When a single RF input channel is received, one of the RF preprocessing circuits 54 or 56 (FIG. 2) receives the RF input signal and generate a real IF signal as the output IF signal. The single real IF signal is selected by the signal selector 58 as the input signal In_1 to the amplifier 150. In the present embodiment, the real IF signal is a low-IF signal. The single real IF signal In_1 is buffered by the amplifier 150 and then filtered by IF filter circuit 153. In this operation mode, IF filter circuit 153 is configured as two real filters and the amplified IF signal In_1 is filtered by IF filter 154. The filtered IF signal is the provided to ADC1 to be digitized as output signal Out_1. Meanwhile, circuitry associated with the second signal path not being used to receive an input channel is powered down to reduce power consumption, as shown by the dashed lines in FIG. 3(d). For instance, the unused RF preprocessing circuit can be powered down. Furthermore, the ADC circuit not being used, such as ADC2, is also powered down. In this manner, when receiver 50 is used to receive a single RF input channel, unused circuitry, such as the RF preprocessing circuit or the ADC circuit, can be powered down to reduce power consumption. In the above description, the single real IF signal is described as being processed by the first signal path including amplifier 150, IF filter 154 and ADC1. This configuration is illustrative only and is not intended to be limiting. The single real IF signal can be processed by the second signal path (amplifier 152, filter 156 and ADC2) with the first signal path being powered off for reducing power consumption. The use of a specific signal path to process the single real IF signal is not critical to the practice of the present invention.

In other embodiments of the present invention, the receiver 50 is configured to operate in a single channel mode with dual ADC for high performance, as shown in FIG. 3(a). In this case, the receiver 50 receives a single RF input channel and one of the RF preprocessing circuit 54 or 56 receives the RF input signal and generates a complex IF signal with a low-IF value. The in-phase I and quadrature-phase Q signal components of the complex IF signal are selected by the signal selector 58 as input signals In_I and In_Q to amplifiers 150, 152. The buffered In_I and In_Q signals are then filtered by IF filter circuit 153 which is configured as one complex filter. Then, the filtered In_I and In_Q signals are coupled to respective ADC circuits ADC1 and ADC2 to be individually digitized as output signals Out_I and Out_Q. In this manner, the two ADC circuits in the dual ADC block 158 are used to process the I and Q signals of the complex IF signal separately for achieving high performance. In some embodiments, the digital IF processor performs IQ imbalance correction on the digitized I and Q signals thus generated to improve the signal quality.

In embodiments of the present invention, the IF filter 153 is formed by two real filters 154 and 156. IF filter 153 is configured as a complex filter by cross-coupling the two real filters 154, 156, as denoted by the cross (X) line between the two real filters in FIG. 3(a). In cases where IF filter 153 is used as two real filters, the cross-coupling path between the two filters is disabled, as shown by the dashed cross (X) lines in FIGS. 3(b) to 3(d).

In other embodiments of the present invention, the receiver 50 is configured to operate in a single channel mode with dual ADC and zero IF, as shown in FIG. 3(b). In this case, receiver 50 receives a single RF input channel and the RF preprocessing circuit 54 or 56 generates a complex IF signal with a zero-IF value. That is, the complex IF signal is centered around DC or 0 Hz. The in-phase I and quadrature-phase Q signals of the complex IF signal are selected by the signal selector 58 as input signals In_I and In_Q to amplifiers 150, 152. The buffered In_I and In_Q signals are then filtered by IF filter circuit 153 which is configured as two real filters 154, 156. That is, the cross-coupling between the two filters are disabled. Then, the filtered In_I and In_Q signals are each coupled to respective ADC circuits ADC1 and ADC2 to be individually digitized as output signals Out_I and Out_Q. In this manner, the two ADC circuits in the dual ADC block are used to process the I and Q signals of a complex zero-IF signal for improved signal quality.

In other embodiments of the present invention, the receiver 50 is configured to operate in a dual channel mode, as shown in FIGS. 3(c). In this case, the receiver 50 receives two RF input channels and the RF preprocessing circuits 54 and 56 each generates a real IF signal associated with each input channel. In the present embodiment, the real IF signal is a low-IF signal. The two real IF signals are selected by the signal selector 58 as input signals In_1 and In_2 to amplifiers 150, 152. The buffered In_1 and In_2 signals are then filtered by IF filter circuit 153 configured as two real filters 154, 156. Then, the filtered In_1 and In_2 signals are each coupled to respective ADC circuits ADC1 and ADC2 to be individually digitized as output signals Out_1 and Out_2. In this manner, the two ADC circuits in the dual ADC block 158 are used to process two real IF signals associated with two input channels to enable the receiver 50 to function as a dual band receiver. In dual channel mode, the receiver operates to reduce cross-talk between the two input channels, enhancing the performance of the system.

In embodiments of the present invention, the receiver 50 is configured to receive one or two input channels with signal bandwidth ranging from few hundred KHz up to 54 MHz in the 40 MHz-3 GHz frequency band. In the present description, a narrowband signal refers to an input signal with a bandwidth below 1 MHz. A wideband signal refers to an input signal with bandwidth greater than a few MHz.

In some embodiments of the present invention, the receiver 50 is configured in the dual channel mode to receive a wideband input signal and a narrowband input signal. In one embodiment, the wideband input signal is an analog format or digital format television signal located in the 40 MHz to 1 GHz frequency band or in the satellite band. On the other hand, the narrowband input signal is a RF input signal in the ISM and L1 frequency bands. Narrowband RF signals include signals such as WIFI signals, GPS signals or RF remote ctrl signals. In one embodiment, the receiver 50 is configured to receive a narrowband RF input signal for use with a narrowband system with operation frequency defined by external component, such as operation frequencies of ISM 915 MHz (US), ISM 433 MHz (EU), ISM 2.4 GHz (WW) and L1. In the case the receiver is configured for satellite reception, the receiver may be configured to tune to the first intermediate frequency signal after the low noise block-downconverter (LNB) of a conventional satellite receiver. For satellite reception, the RF preprocessing circuit of the receiver can be continuously tuned over a 900 MHz to 1.9 GHz range.

Figure 4:
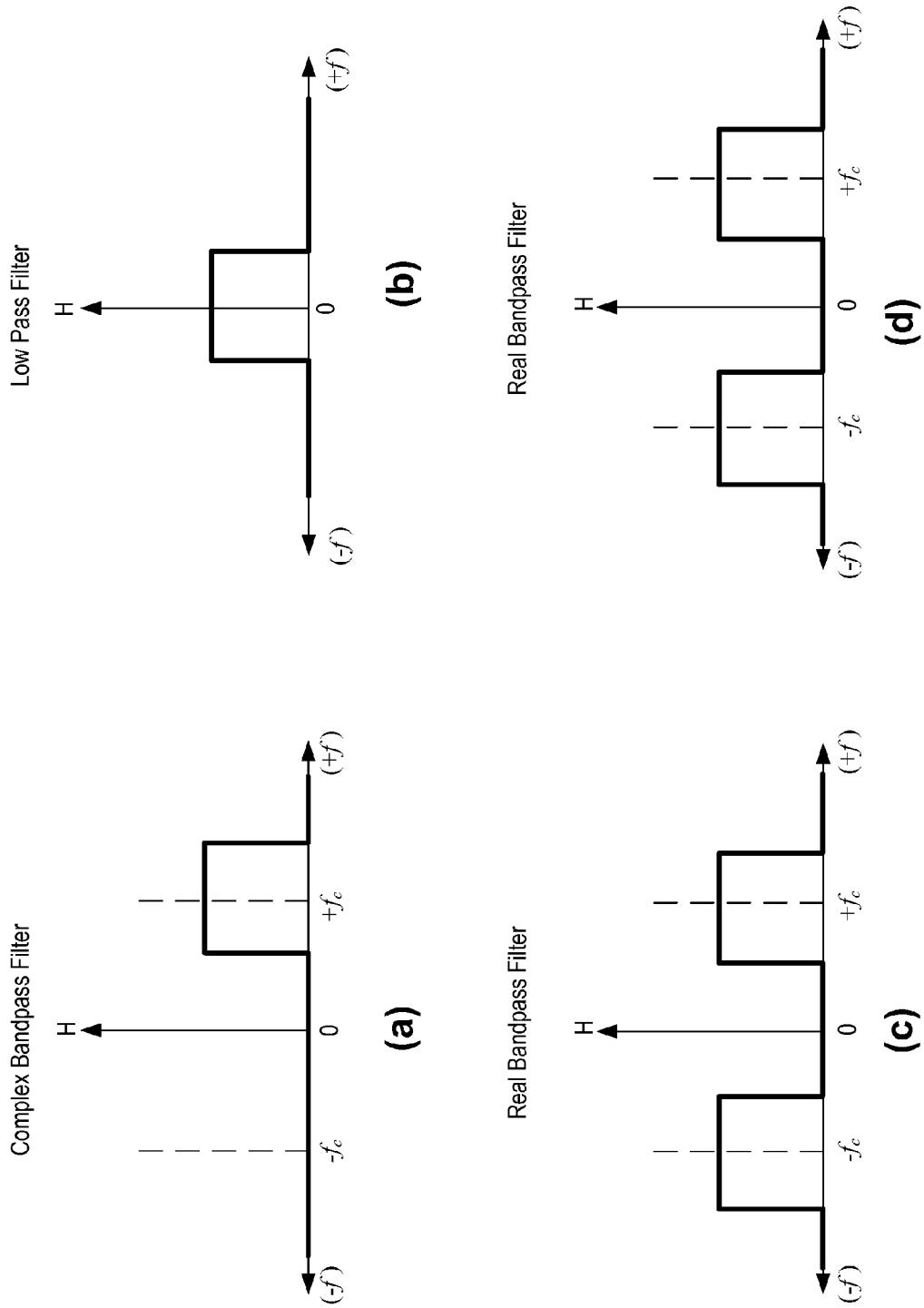
FIG. 4, which includes

FIG. 4, which includes FIGS. 4(a) to 4(d), illustrates the IF filters which can be used for each of the four operation modes in FIG. 3 according to embodiments of the present invention. Referring to FIG. 4, in the signal channel complex low-IF operation mode (FIG. 3(a)), the IF filter 153 is configured as a complex filter. The complex filter can be implemented as a complex bandpass filter passing only positive frequencies centered around the center frequency $f_c$ being the low intermediate frequency, as shown in FIG. 4(a). In the single channel complex zero-IF operation mode (FIG. 3(b)), the IF filter 153 is configured as two real filters. Each of the real filters can be implemented as a low pass filter, as shown in FIG. 4(b). In the dual channel low-IF operation mode (FIG. 3(c)), the IF filter 153 is configured as two real filters. Each of the real filters can be implemented as a real bandpass filter passing positive and negative frequencies centered around the center frequency $f_c$ being the low intermediate frequency, as shown in FIG. 4(c). In the single channel real low-IF operation mode (FIG. 3(d)), the IF filter 153 is configured as a real filter. The real filter can be implemented as a real bandpass filter passing positive and negative frequencies centered around the center frequency $f_c$ being the low intermediate frequency, as shown in FIG. 4(d).

Figure 5:
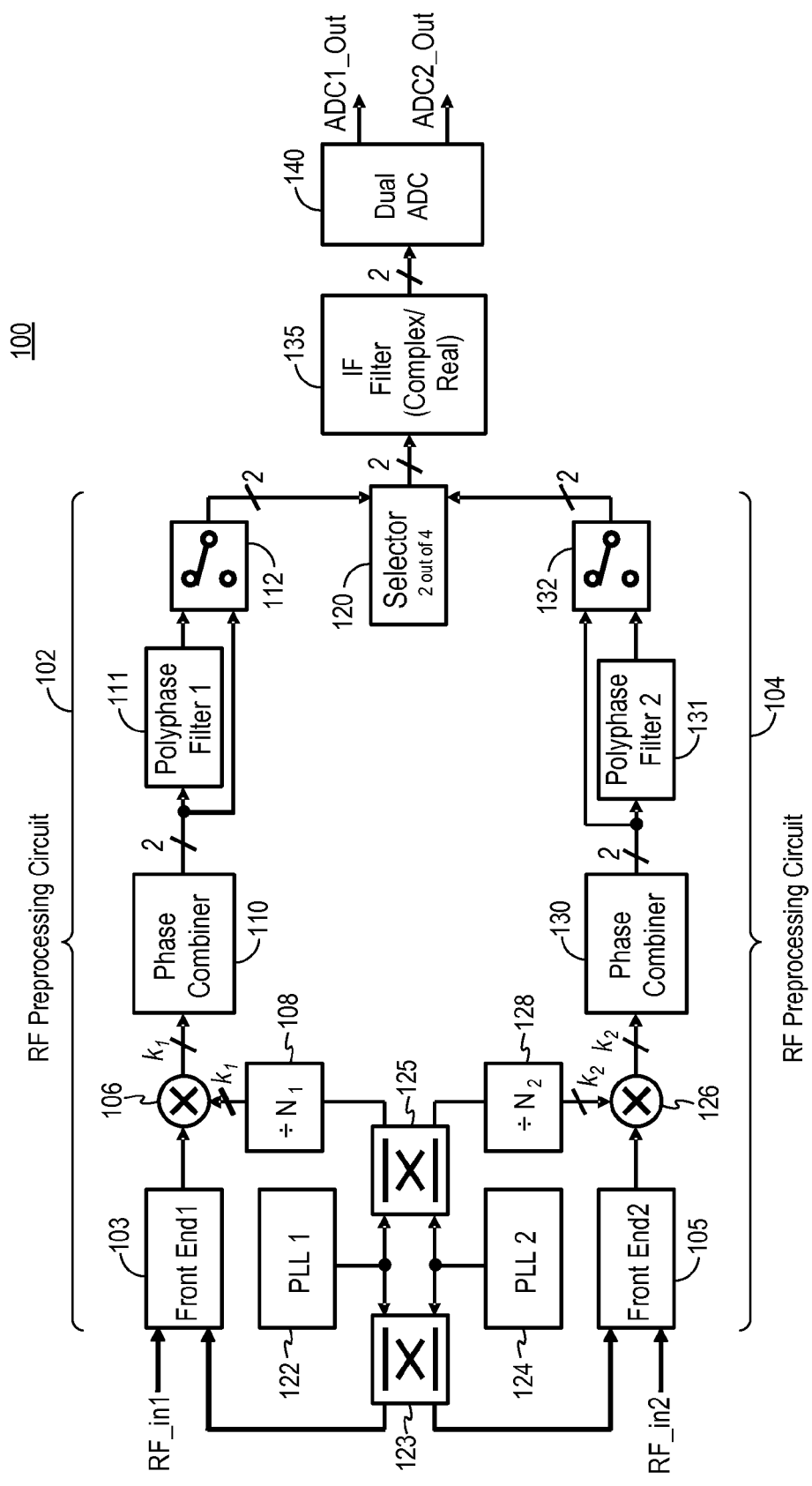
FIG. 5 is a detailed schematic diagram of the preprocessing of the radio frequency receiver of FIG. 2 according to one embodiment of the present invention.

FIG. 5 is a detailed schematic diagram of the preprocessing of the radio frequency receiver of FIG. 2 according to one embodiment of the present invention. Referring to FIG. 5, a receiver 100 receives radio frequency (RF) input signal RF_in1 as a first input channel and RF input signal RF_in2 as a second input channel from an input source, such as an antenna or a cable connection. Each of the RF input signals is coupled to respective first and second RF preprocessing circuits 102 and 104. The first and second RF preprocessing circuits 102 and 104 are constructed in a similar manner with individual circuit elements configured for the desired reception bandwidth, where applicable.

More specifically, the first preprocessing circuit 102 includes a first front end circuit 103 (Front End1) configured to receive the RF input signal RF_in1 and may perform filtering and amplifying functions. The received RF input signal is then provided to a mixer 106 to downconvert the RF input signal by a down-conversion frequency provided by a frequency divider 108. In the present embodiment, mixer 106 is a dual-phase quadrature mixer generating two quadrature phase outputs (that is, $k_1=2$). In other embodiments, mixer 106 can be implemented as a multi-phase mixer. Frequency divider 108 provides the down-conversion frequencies with the necessary phase differences to the mixer 106.

The output from the mixer 106 is provided to a phase combiner 110. Phase combiner 110 is optional and may be omitted in other embodiments of the present invention, as will be explained in more detail below. The output signal from the mixer or from the phase combiner 110 is provided to a polyphase filter 111 (Polyphase Filter 1) and to a bypass path bypassing the polyphase filter 111. The polyphase filter 111 implements image rejection and generates an image rejected output signal. In some cases, such as when a zero-IF is used, image rejection is not necessary and polyphase filter 111 may be bypassed. The image rejected output signal and the bypassed signal are coupled to a signal multiplexer 112 which provides either the image rejected output signal or the bypassed signal to the signal selector 120.

The second preprocessing circuit 104 is constructed in a similar manner as the first preprocessing circuit 102. The second preprocessing circuit 104 includes a second front end circuit 105 (Front End2), a mixer 126 driven by a down-conversion frequency provided by a frequency divider 128, an optional phase combiner 130, a polyphase filter 131 (Polyphase filter 2) and a signal multiplexer 132. The signal multiplexer 132 receives the image rejected output signal from the polyphase filter 121 or a bypassed signal and provides the selected signals to the signal selector 120. In the present embodiment, mixer 126 is a dual-phase quadrature mixer generating two quadrature phase outputs (that is, $k_2=2$). In other embodiments, mixer 126 can be implemented as a multi-phase mixer. Frequency divider 128 provides the down-conversion frequencies with the necessary phase differences to the mixer 126.

The frequency divider 108 has a frequency division factor N1 while the frequency divider 128 has a frequency division factor N2. Frequency division factors N1 and N2 may be the same or may be different.

The signal selector 120 selects two out of the four output signals provided by the first and second preprocessing circuits 102, 104 depending on the operation mode selected for the receiver 100. The selected signals are coupled to IF filter circuit 135. The filtered signals are then provided to the dual ADC block 140 for analog-to-digital conversion, thereby generating digital signals ADC1_Out and ADC2_Out. The digital signals ADC1_Out and ADC2_Out are then coupled to the digital IF processor (not shown) to be processed into baseband signals.

As described above, in the present embodiment, mixers 106 and 126 are dual-phase quadrature mixer generating two quadrature phase outputs (that is, $k_1, k_2=2$). In other embodiments, the mixer 106 or 126 can be implemented as a multiphase mixer. In that case, the mixer generates multiple mixer output signals (that is, $k_1, k_2>2$) which can be combined by the phase combiner configured to compute a linear combination of all of the mixer output signals and generate quadrature baseband signals I and Q at low IF or zero-IF. In the case where the mixers 106, 126 are dual-phase mixers (that is, $k_1$, $k_2=2$), the phase combiners 110, 130 may be omitted. In one embodiment, the mixer 106 of the first preprocessing circuit 102 is a quad-phase mixer while the mixer 126 of the second preprocessing circuit 104 is a dual-phase mixer. In this case, the mixer 106 is coupled to phase combiner 110 but the phase combiner 130 may be omitted.

In some embodiments, the polyphase filters 111 and 131 perform image rejection on the down-converted IF signals for low-IF signals. The polyphase filters 111 and 131 are bypassed when the down-converted IF signals are zero-IF signals as zero-IF signals do not have the undesired image signals. In embodiments of the present invention, the polyphase filters 111 and 131 are configured as tunable filters. In one embodiment, one of the polyphase filters is configured for wideband filtering, such as up to 8 MHz, and the other is configured for narrowband filtering, such as from 1-2 MHz, to support dual band reception.

The quality of the image rejection depends on the accuracy of the amplitude and relative phase of the mixer output signals. The amplitude of the mixer output signals is dependent on device matching inside the mixer circuit. The phase accuracy of the signals is dependent on the accuracy of the frequency signals delivered by the frequency dividers. In some embodiment, phase inaccuracies are corrected or compensated by modulating the respective phases delivered by the frequency dividers 108, 128 driving the mixers, or by altering the gain and phase at the output of the mixer or inside the phase combiners. In one embodiment, the gain and phase of the mixer or the phase combiners can be altered by altering the resistive and capacitive load of a transconductor inside the circuits.

The receiver 100 includes two frequency synthesizers 122 and 124 generating first and second clock signals. The two frequency synthesizers are in a configurable arrangement to drive either of the front end circuits 103, 105 and the mixers 106, 126. More specifically, a first frequency selector 123 connects the first frequency synthesizer 122 and/or the second frequency synthesizer 124 to the first front end circuit 103 and/or the second front end circuit 105. Similarly, a second frequency selector 125 connects the first frequency synthesizer 122 and/or the second frequency synthesizer 124 to the first frequency divider 108 associated with the mixer 106 and/or the second frequency divider 128 associated with the mixer 126. As thus configured, the frequency selectors 123, 125 enable the first and second preprocessing circuits 102, 104 to be reconfigurable to operate with the intermediate frequency values.

In the present embodiments, the two frequency synthesizers 122, 124 are implemented as phase-locked loops PLL1 and PLL2. In one embodiment, the voltage-controlled oscillator (VCO) of each frequency synthesizer is implemented using an LC-tank VCO having a limited tuning range. In one embodiment, the VCO has a tuning range much less than 1.2. In another embodiment, the VCO has a tuning range from 1.5 to 1.7. The tuning range of each VCO is chosen so that the whole frequency bands of interest can be covered by a sequence of programmable integer frequency multipliers and dividers. In one embodiment, $k_1=4$, $k_2=2$ and the last divider in the frequency divider 108 ($\div N_1$) is a divider-by-4 that provides the 4 phases required by the mixer 106, for instance, 0/45/90/135 degrees. The last block in the frequency divider 128 ($\div N_2$) is a divider-by-2 that provides 2 phases required by the mixer 126, for instance, 0/90 degrees.

In some embodiments, the VCOs are operated in several subranges to improve performances. Within a subrange, the control voltage changes the frequency. There is a proper acceptable range for the control voltage. The best subrange can be selected by monitoring the control voltage with a low-performance ADC (such as double-ramp type; low-speed, low accuracy 8-10 bits). A stable and correct control voltage can be utilized as an indicator of lock for the PLL. In some embodiments, the same low-performance ADC used to monitor the control voltage is shared by both frequency synthesizers and also perform other monitoring functions, such as multiple amplitude measurements for automatic gain control. The ADC can be shared by using a multiplexer.

In yet other embodiments, each VCO can be connected to a frequency meter for rapid testing of the VCO operation in each range and/or for rapid determination of optimum subrange. The same frequency meter input can be multiplexed and be used for other purpose, such as calibrating other LC tanks in the system, by forcing the tank to oscillate.

In one embodiment, the second frequency synthesizer 124 is also configured for calibration purpose. The second frequency synthesizer 124 is used to generate a signal that is injected in the front-end circuits. This signal can be used to verify the operation of the complete demodulation chain, such as for self-test, or for calibration purpose for adjusting the overall gain or response flatness.

In embodiments of the present invention, the receiver 100 includes one or more programmable gain amplifiers (PGA) at various points in the circuit to provide gain boost. More specifically, in some embodiments, a programmable gain amplifier is included in the signal path whenever the signal is being transformed. For instance, each time the RF signal bandwidth is being reduced by a filter, an amplifier is provided to boost the gain of the signal. In one embodiment, a PGA is included one or more of these locations in the circuitry of the receiver 100: (1) at the input to the front end circuits 103, 105; (2) after the low-noise amplifier in the front end circuits; (3) before or after the mixers 106, 126; (4) before or inside the polyphase filters 111, 131; (5) before the IF filter circuit 135; and (6) before the dual ADC block 140.

In some embodiments, amplitude detectors are placed inside each circuit block along the signal path to measure the amplitude of the signal. The measurement circuit, such as an ADC, can be shared among multiple detectors using multiplexers.

Figure 6:
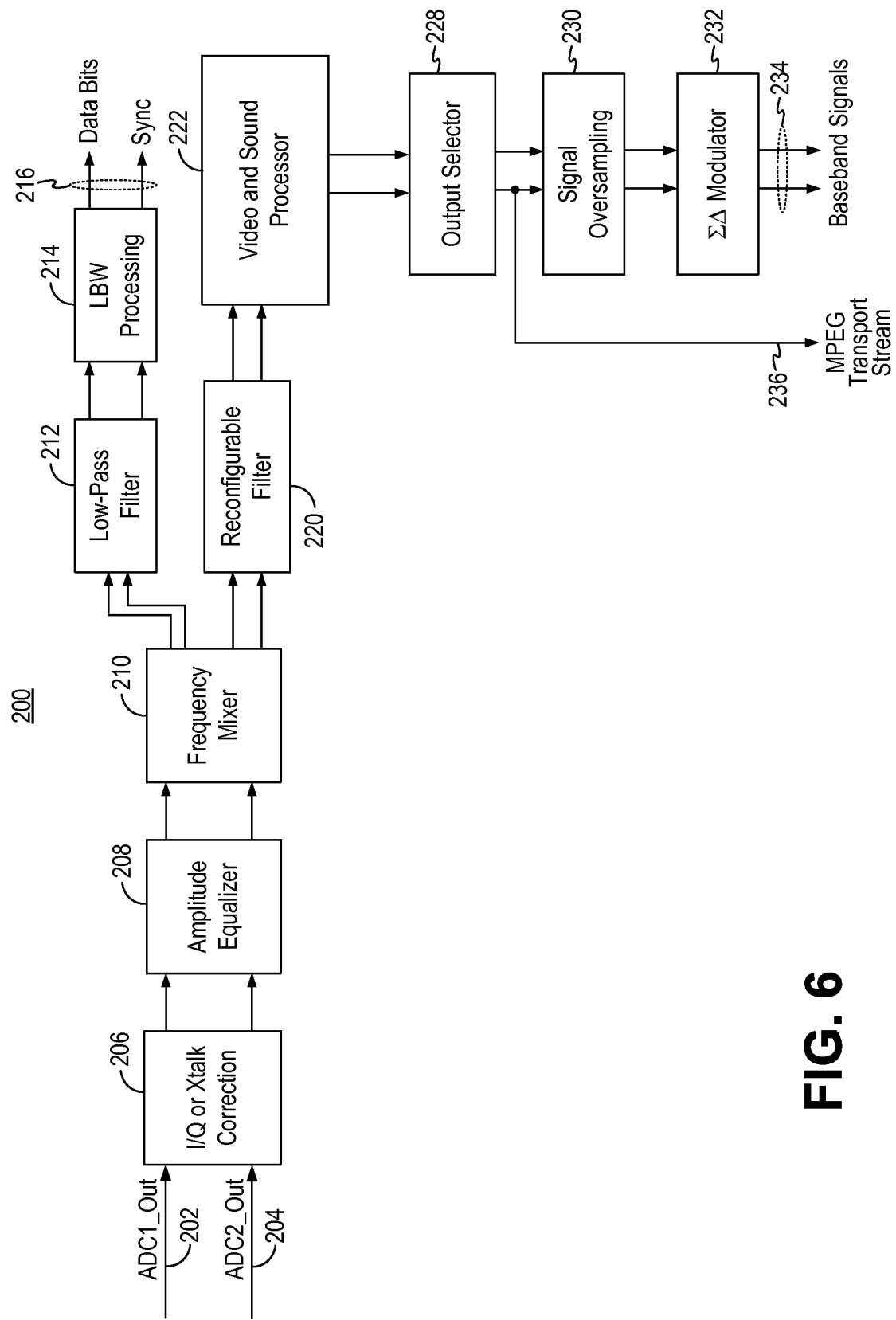
FIG. 6 is a schematic diagram of a digital IF processor of the radio frequency receiver of FIG. 2 according to one embodiment of the present invention.

FIG. 6 is a schematic diagram of a digital IF processor of the radio frequency receiver of FIG. 2 according to one embodiment of the present invention. Referring to FIG. 6, digital IF processor 200 is a configurable digital IF processor. The digital IF processor 200 receives the digitized output signals ADC1_out and ADC2_out from the dual ADC block 62 (FIG. 2) as input signals 202, 204 and generates baseband signals 234 as output signals for analog modulation signals and generate a MPEG transport stream 236 as output signals for digital modulation signals.

In digital IF processor 200, the input signals ADC1_out and ADC2_out are first coupled to a signal correction block 206. The signal correction block 206 is configurable based on the operation mode the receiver is configured in. When the receiver is configured in the single channel mode with dual ADC and zero or Low-IF complex signal, the input signals ADC1_out and ADC2_out are the in-phase I and quadrature phase Q signals of the complex IF signal and the signal correction block 206 is configured to perform I/Q imbalance correction. That is, the signal correction block 206 operates to reduce image leakage due to imperfect I/Q balance. The signal correction block 206 can also correct for imbalance introduced in circuitry after the mixer, such as imbalance introduced by the IF filter circuit or the dual ADC circuit. On the other hand, when the receiver is configured in the dual channel mode for receiving two RF input channels, the signal correction block 206 is configured to reduce signal cross-talk between the two input channels. That is, the signal correction block 206 operates to reduce leakage between the two input channels.

An amplitude equalizer block 208 follows the signal correction block 206. The amplitudes of the two input signals are equalized after the signal correction. Then, the signals are provided to a frequency mixing block 210 which is configurable and can be configured to down-convert two real low-IF signals to complex baseband signals or down-convert a single complex/real low-IF signal to a zero-IF signal.

In the present embodiment, the digital IF processor 200 includes circuitry for processing a low bandwidth signal. The low bandwidth processing circuitry is optional and may be omitted in other embodiments of the present invention. For low bandwidth processing, the output signals from the frequency mixer 210 are first provided to a low-pass filter 212. The low-pass filter 212 has a center frequency around DC and a bandwidth that is programmable to filter a low data-rate digital data stream. The low-pass filtered signals are then provided to a low-bandwidth processing block 214 which processes the low-pass filtered signals to generate digital data bits and a synchronization signal (Sync) as output signals 216. The data bits may contain control information such as the remote control signal from a remote control of a television system.

In the present embodiment, the digital IF processor 200 includes circuitry for processing the digitized input signals ADC1_out and ADC2_out as television signals include video and sound signals. To that end, the digital IF processor 200 includes a reconfigurable filter 220 where the filter structure can be reconfigured to either implement an All-Pass Transfer function, a Low-Pass Transfer function or a combination of both. The filtered signals are then provided to a video and sound processor 222 for performing demodulation or decoding depending on the nature of the input channel received. The video and sound signals generated by the video and sound processor 222 are coupled to an output selection circuit 228 which is operative to select between analog demodulated signals (video and audio) or decoded digital signals. The decoded digital signals are provided as output signals of the digital IF processor 200 in the form of a MPEG transport stream 236. The analog demodulated signals are provided to a signal oversampling block 230 that oversamples the analog demodulated signals before providing the over-sampled signals to a modulator 232. The modulator 232 generates baseband signals 234 for analog format television signals. In the present embodiment, the modulator 232 is a sigma delta modulator. The baseband signals 234 can be used to drive a dual digital-to-analog converter (DAC). The analog signals generated from the baseband signals are then used for display or playback.

The above detailed descriptions are provided to illustrate specific embodiments of the present invention and are not intended to be limiting. Numerous modifications and variations within the scope of the present invention are possible. The present invention is defined by the appended claims.

We claim:

1. A radio frequency receiver, comprising:
a first RF preprocessing circuit configured to receive a first RF input signal associated with a first input channel and to generate output signals indicative of a first intermediate frequency (IF) signal;
a second RF preprocessing circuit configured to receive a second RF input signal associated with a second input channel and to generate output signals indicative of a second IF signal;
a signal selector configured to select a set of signals from the output signals of the first and second RF preprocessing circuits;
a configurable intermediate frequency (IF) filter circuit configured to filter the set of signals selected by the signal selector; and
a dual analog-to-digital converter (ADC) circuit comprising a first ADC circuit and a second ADC circuit, the dual ADC circuit being configured to receive the filtered signals from the IF filter circuit and to digitize the filtered signals using one or both of the first and second ADC circuits based on one or more operation modes, the dual ADC circuit being configured to generate digital output signals indicative of one or more digitized IF signals,
wherein when the receiver is configured to receive one input channel only on one of the first and second RF preprocessing circuits, the dual ADC circuit is configured in a first operation mode to receive at least one filtered signal associated with the one input channel and to digitize the at least one filtered signal using at least one of the first and second ADC circuits; and
wherein when the receiver is configured to receive two input channels on the first and second RF preprocessing circuits respectively, the dual ADC circuit is configured in a second operation mode to receive filtered signals associated with the two input channels and to digitize the filtered signals associated with each input channel using the first and second ADC circuits respectively.

2. The radio frequency receiver of claim 1, wherein when the receiver is configured to receive one input channel only on one of the first and second RF preprocessing circuits, the dual ADC circuit is further configured in a third operation mode to receive two filtered signals associated with the input channel, the two filtered signals being indicative of the in-phase (I) signal and quadrature-phase (Q) signal of a complex IF signal, and the dual ADC circuit is configured in the third operation mode to digitize the in-phase signal I using the first ADC circuit and to digitize the quadrature-phase signal Q using the second ADC circuit.

3. The radio frequency receiver of claim 2, wherein the two filtered signals are indicative of the in-phase (I) signal and quadrature-phase (Q) signal of a complex IF signal centered around a low intermediate frequency value.

4. The radio frequency receiver of claim 2, wherein the two filtered signals are indicative of the in-phase (I) signal and quadrature-phase (Q) signal of a complex zero-IF signal centered around DC or zero hertz.

5. The radio frequency receiver of claim 3, wherein the low intermediate frequency value comprises a frequency value at 40 MHz or lower.

6. The radio frequency receiver of claim 2, wherein the configurable intermediate frequency (IF) filter is configured as a complex IF filter.

7. The radio frequency receiver of claim 6, wherein the complex IF filter is formed by cross-coupling of two real IF filters.

8. The radio frequency receiver of claim 1, wherein when the receiver is configured to receive one input channel only on one of the first and second RF preprocessing circuits, the dual ADC circuit is configured in the first operation mode to receive one filtered signal associated with the one input channel, the one filtered signal indicative of a real IF signal, and the dual ADC circuit is configured in the first operation mode to digitize the one filtered IF signal using one of the first and second ADC circuits and is further configured to power off the other one of the first and second ADC circuits not being used.

9. The radio frequency receiver of claim 8, wherein the one filtered signal comprises a real IF signal centered around a low intermediate frequency value.

10. The radio frequency receiver of claim 8, wherein the configurable intermediate frequency (IF) filter is configured as a real IF filter.

11. The radio frequency receiver of claim 1, wherein when the receiver is configured to receive two input channels on respective first and second RF preprocessing circuits, the dual ADC circuit is configured in the second operation mode to receive a first filtered signal associated with a first input channel and a second filtered signal associated with the second input channel, the first and second filtered signals indicative of two real IF signals, the dual ADC circuit is configured in the second operation mode to digitize the first filtered signal using the first ADC circuit and the second filtered signal using the second ADC circuit.

12. The radio frequency receiver of claim 11, wherein the first and second filtered signals each comprises a real IF signal centered around a low intermediate frequency value.

13. The radio frequency receiver of claim 11, wherein the configurable intermediate frequency (IF) filter is configured as two real IF filters.

14. The radio frequency receiver of claim 12, wherein the low intermediate frequency value comprises a frequency value at 40 MHz or lower.

15. The radio frequency receiver of claim 1, wherein each of the first and second preprocessing circuits comprises:
- a front end circuit configured to receive an RF input signal associated with an input channel;
- a mixer configured to downconvert the RF input signal by a down-conversion frequency to generate a down-converted signal;
- a polyphase filter configured to perform image rejection on the down-converted signal to generate an image rejected output signal; and
- a multiplexer configured to select the down-converted signal or the image rejected output signal and configured to provide the selected signal to the signal selector,
- wherein the image rejected output signal and the down-converted signal each comprises a real IF signal or a complex IF signal.

16. The radio frequency receiver of claim 15, wherein the mixer in each of the first and second preprocessing circuits comprises a multiphase mixer generating a set of down-converted output signals having different phases, and each of the first and second preprocessing circuits further comprises:
- a phase combiner coupled to combine the set of down-converted signals to generate quadrature baseband signals, the quadrature baseband signals being provided to the polyphase filter for image rejection and also being provided to the multiplexer for signal selection.

17. The radio frequency receiver of claim 15, wherein each of the first and second preprocessing circuits further comprises:
- a first frequency synthesizer and a second frequency synthesizer generating respective first and second clock signals;
- a first frequency selector configured to select one of the first and second frequency synthesizers to be connected to each of the first and second front end circuits; and
- a second frequency selector configured to select one of the first and second frequency synthesizers to be connected to the mixer of each of the first and second preprocessing circuits.

18. The radio frequency receiver of claim 17, wherein each of the first and second preprocessing circuits further comprises:
- a frequency divider coupled to receive the clock signal from the selected frequency synthesizer and configured to perform frequency division on the clock signal, the frequency divider providing divided down clock signals to the mixer.

19. The radio frequency receiver of claim 2, further comprises a digital IF processor configured to receive the digital output signals indicative of one or more digitized IF signals from the dual ADC circuit, the digital IF processor configured to process the digitized IF signals to generate output signals indicative of the input channels,
wherein when the dual ADC circuit is operated in the third operation mode, the digital IF processor operates to performs I/Q imbalance correction on the digitized in-phase signal and the digitized quadrature-phase signal.

20. The radio frequency receiver of claim 11, further comprises a digital IF processor configured to receive the digital output signals indicative of one or more digitized IF signals from the dual ADC circuit, the digital IF processor configured to process the digitized IF signals to generate output signals indicative of the input channels,
wherein when the dual ADC circuit is operated in the second operation mode, the digital IF processor operates to performs cross-talk reduction between the digitized IF signals associated with the two input channels.

* * * * *